United States Patent
Kuts

[15] 3,701,186
[45] Oct. 31, 1972

[54] TRIMMING MACHINE
[72] Inventor: Mathew Kuts, Akron, Ohio
[73] Assignee: The B. F. Goodrich Company, New York, N.Y.
[22] Filed: Feb. 18, 1971
[21] Appl. No.: 116,455

[52] U.S. Cl................29/33 A, 83/3, 83/925 EB, 83/432
[51] Int. Cl.....................B29h 7/22, B29h 3/06
[58] Field of Search............83/3, 432, 176, 925 EB; 29/33 R, 33 A

[56] References Cited
UNITED STATES PATENTS

| | | |
|---|---|---|
| 1,805,688 | 5/1931 | Davis................................83/3 |
| 1,958,122 | 5/1934 | Ambler.....................83/432 X |
| 2,588,647 | 3/1952 | Mitchell....................83/432 X |
| 3,266,352 | 8/1966 | Kuts.........................83/925 EB |

*Primary Examiner*—Donald R. Schran
*Attorney*—Joseph Januszkiewicz and W. A. Shira, Jr.

[57] ABSTRACT

A trimming machine having a pair of cutters which trim the respective sides of a V-belt in cooperation with a retractable rotary cutter that operates on the smaller surfaces of the V-belt parallel surfaces when viewed in cross section, to provide a more uniform and a controlled dimensional core for a V-belt.

13 Claims, 8 Drawing Figures

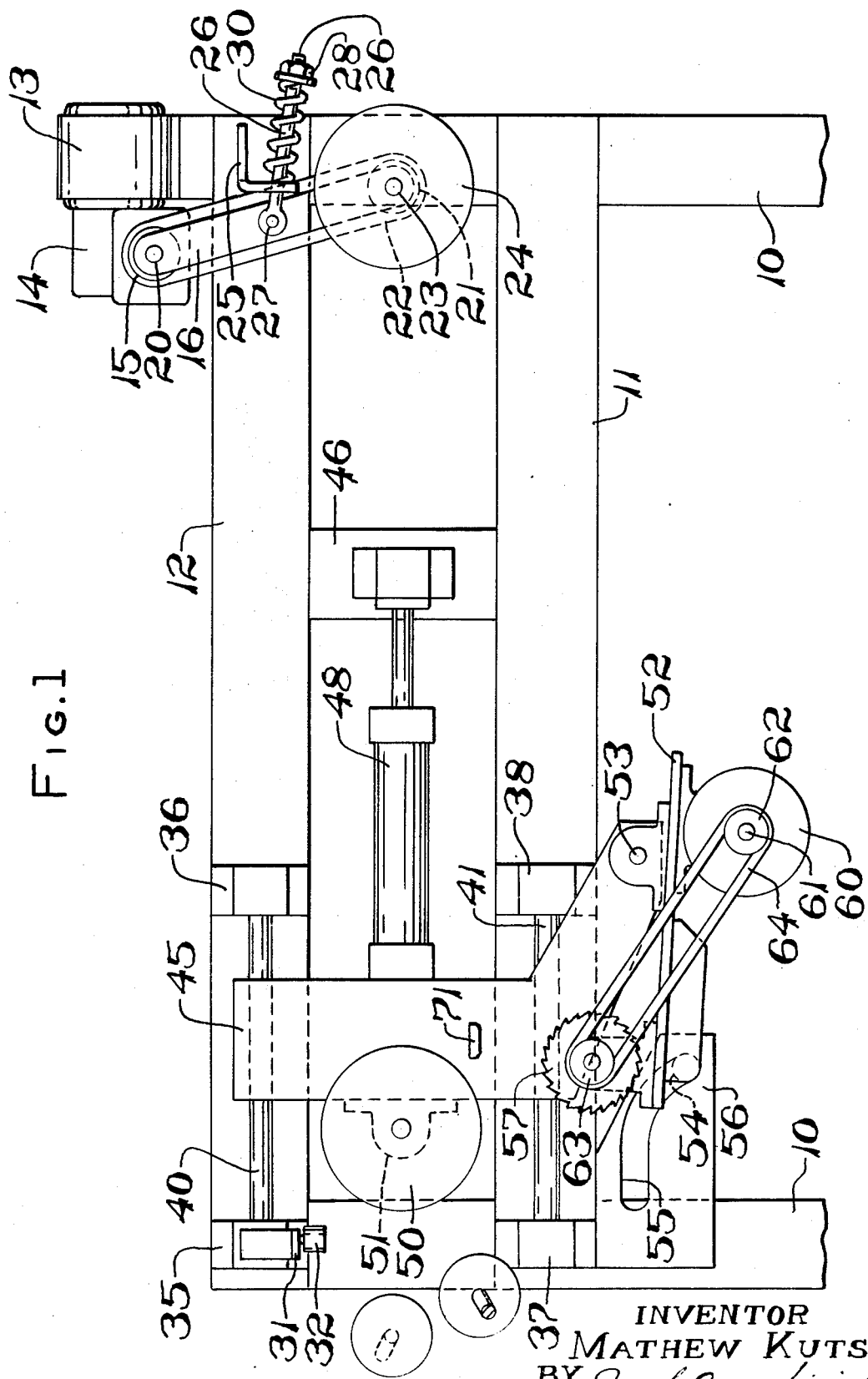

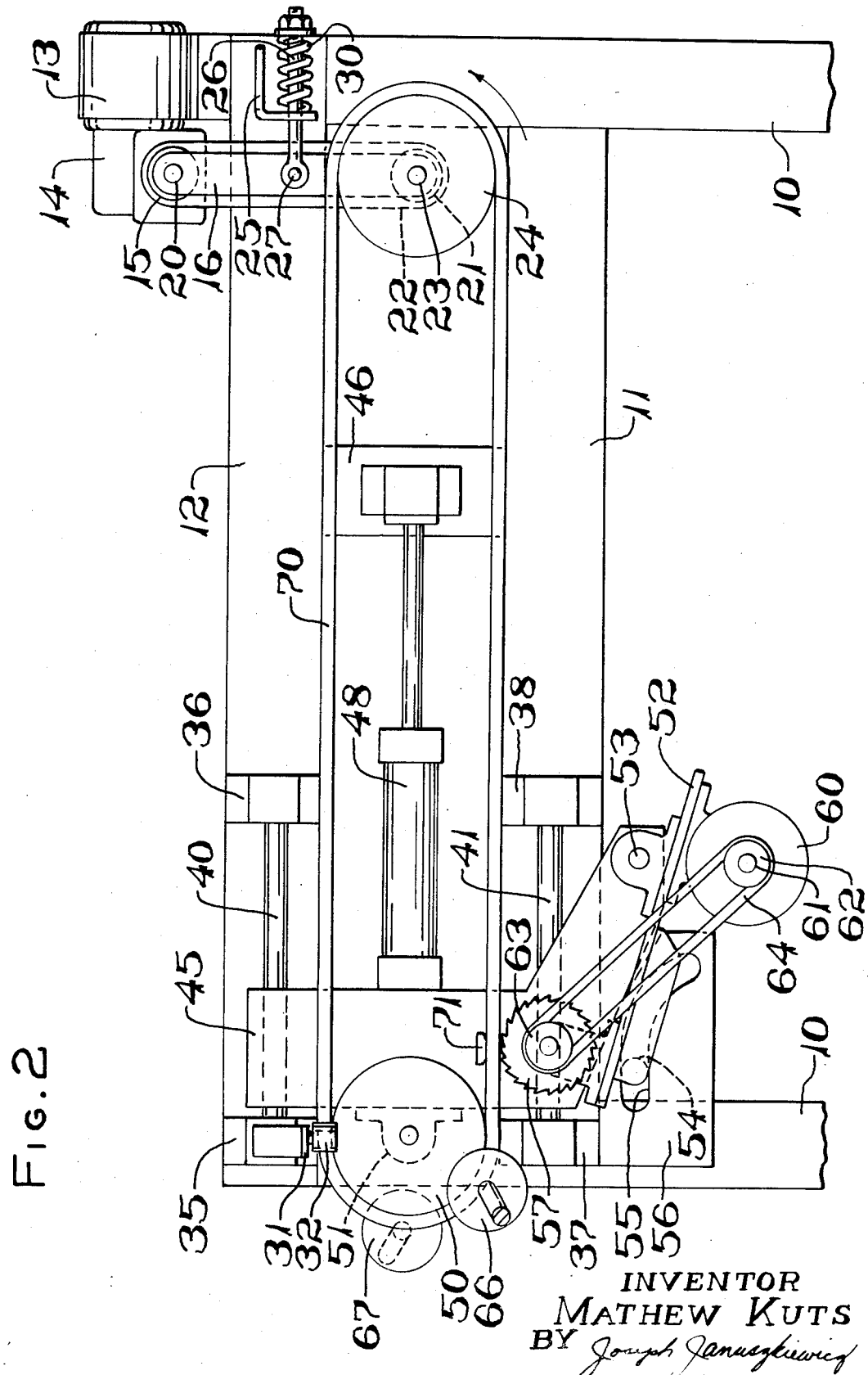

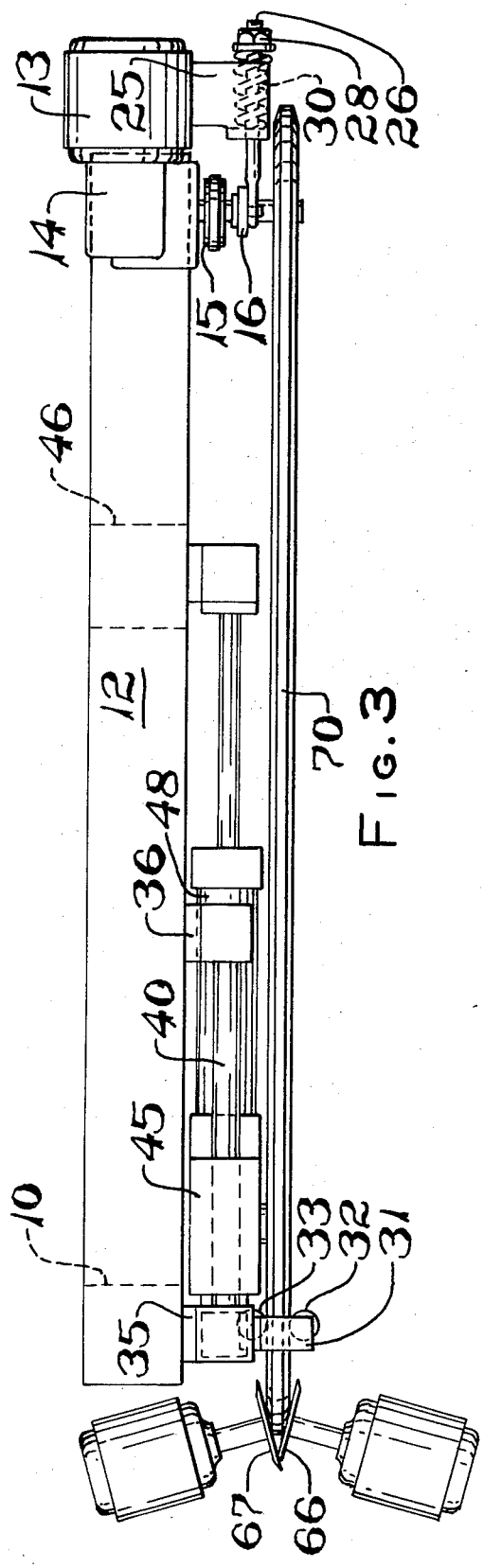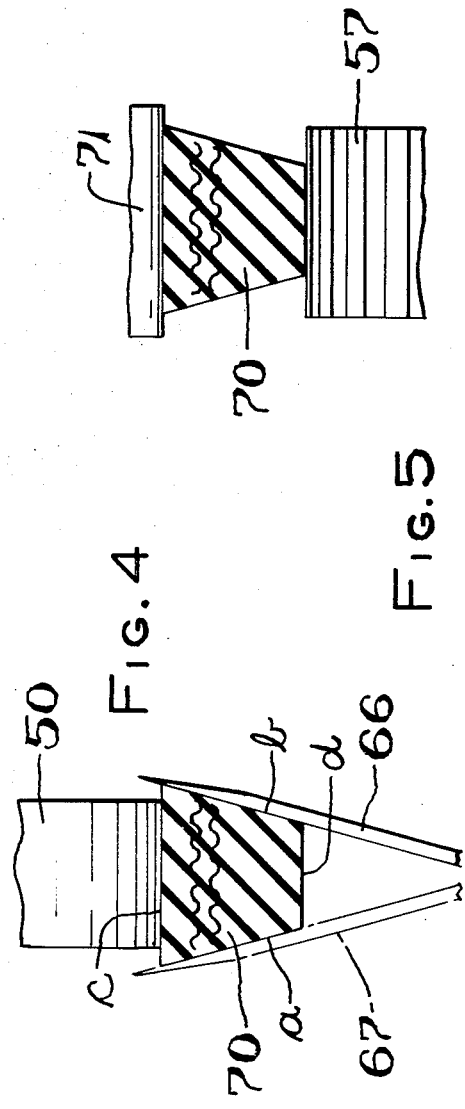

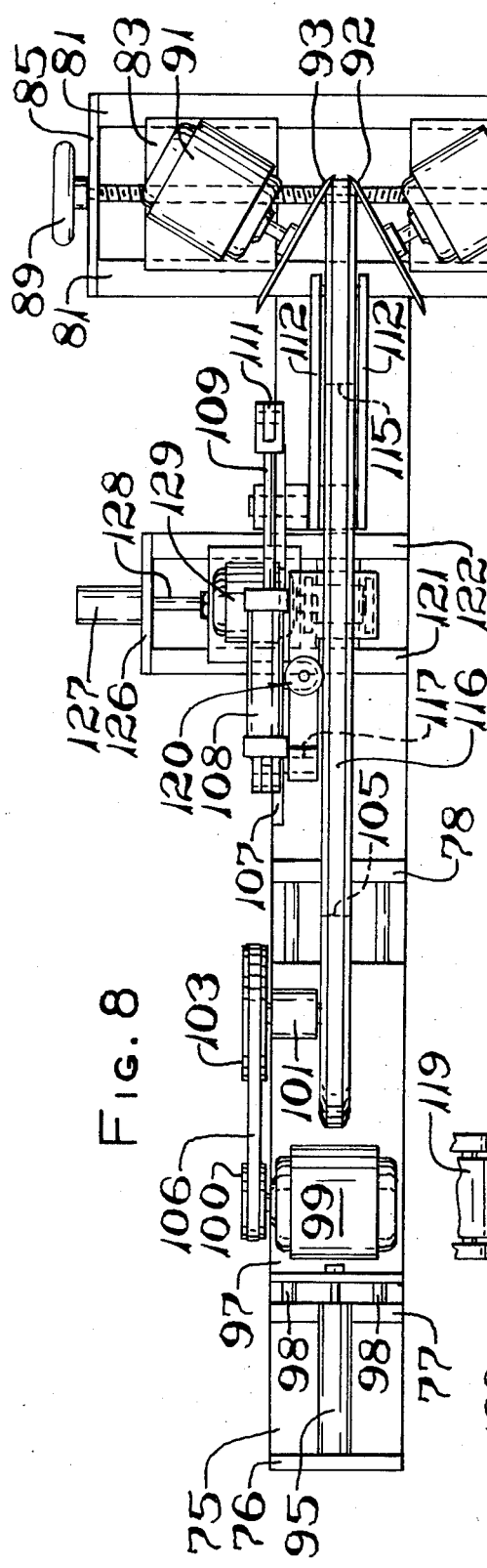

3,701,186

TRIMMING MACHINE

BACKGROUND OF THE INVENTION

This invention relates to trimming machines and more particularly to a V-belt trimming machine which trims the opposite slanted sides of the belt simultaneously while trimming the smaller surface side of the parallel surfaces of a V-belt.

In the manufacture of endless V-belts, which have trapezoidal cross sections, it is customary to build wide band belts by the use of plies of fabric and unvulcanized rubber which belts are then cut into a plurality of belt cores. The belt cores are then trimmed along the sides to change the cross-sectional shape from a rectangular form to a trapezoidal form, which forms the so-called V-belt form. It is essential that the cuts be made to provide a belt that is of a consistent weight per unit length so that it may be molded to the proper shape. The cores are then covered by an envelope ply of fabric and cured to the desired cross section in molds. If an insufficient amount of material is provided in the rectangular form, little cutting or trimming is done since it is desirable to maintain a given dimension and unit weight; however, herein the cross-sectional shape must be changed in the next operation which is a molding operation to a greater extent to achieve the desired V-belt shape. Such action presents difficulties in that the plies of fabric may become angularly oriented, which in effect is the noncentering of the cords resulting in a nonuniform construction which is undesirable. Where the belt cores are initially of a much greater weight per unit length than desired, greater angular cut must be made to reduce the weight to the desired level. Such cutting or trimming adversely affects the end shape desired as it is desired to have the belt fit the mold with the least amount of required flowing of the material during cure. The present invention contemplates the use of a rotary cutter that is cooperative with a pair of opposed cutters to assure a properly dimensioned belt core easily and simply thereby facilitating the fabrication of a more uniform belt economically, quickly and with a minimum of scrap such as to attain better weight control thereof. Such rotary cutter is retractable into an inoperative position for safety reasons to permit the unobstructive loading and unloading of the V-belt.

SUMMARY OF THE INVENTION

The present invention is directed to the production of V-belts and the like wherein a pair of spaced opposed cutters cut a trapezoidal cross sectioned endless belt from a rectangular cross sectioned belt and wherein such spaced cutters further cooperate with a third cutter that is retractable and is adapted to operate on the smaller V-surface of the parallel faces of the V-belt to provide a properly proportioned V-belt to minimize distortion.

BRIEF DESCRIPTION OF THE DRAWINGS

FIG. 1 is a side elevational view of the belt cutting apparatus;

FIG. 2 is a side elevational view of the belt cutting apparatus in the operating condition;

FIG. 3 is a plan view of the belt cutting apparatus;

FIG. 4 is a cross-sectional view of the V-belt with the cutters operating on the sides of the V-belt; and FIG. 5 is a cross-sectional view of the V-belt showing a rotary cutter trimming the smaller running surface of the V-belt;

FIG. 6 is a side-elevational view of a modified form of belt cutting apparatus;

FIG. 7 is a cross-sectional view of the belt cutting apparatus shown in FIG. 6 taken along line 7—7 of FIG. 6; and FIG. 8 is a plan view of the modified form of the belt cutting apparatus shown in FIG. 6.

DETAILED DESCRIPTION

Referring to the drawings wherein like reference characters designate like and corresponding parts throughout the several views, there is shown in FIG. 1 spaced frame members designated by numeral 10. A pair of cross members 11 and 12 extend across the upper end portion of frame members 10, which together with frame members 10 forms support means to support the various components of the cutting apparatus. Mounted on one end of cross member 12 is a motor 13 which motor 13 through transmission means 14 drives a sheave 15. One end of an elongated lever member or support member 16 is pivotally mounted as at 20 on the same axis as sheave 15. Support member 16 has a sheave 1 21 mounted on the other end portion thereof. A belt 22 trained about sheaves 21 and 15 operates to transmit power from motor 13 to a shaft 23 which is keyed to sheave 21. Mounted on the same shaft 23 as sheave 21 and journaled for rotation therewith is a pulley 24 for a purpose to be described. Also mounted on the rearward portion of cross member 12 is an L-shaped bracket 25 having an opening on the lower depending leg member thereof. Slidably journaled within the opening on lower depending leg of L-shaped bracket 25 is a rod 26, which rod 26 has one end pivotally connected as at 27 to the intermediate portion of lever member or support member 16. The other end portion of rod 26 is threaded to receive a washer and nut 28 such that a spring 30 encompassing such rod 26 will have one end abuttingly engaging the lower depending leg member of L-shaped bracket 25 and the other end abuttingly engaging the washer adjacent to a nut 28, thereby biasing lever member 16 in a counterclockwise direction as viewed in FIGS. 1 and 2. Cross member 12 has a pair of spaced brackets 35 and 36 located on the forwardly disposed portion thereof or on the left portion thereof as viewed in FIG. 1, while cross member 11 has brackets 37 and 38 located substantially in alignment with brackets 35 and 36. Extending longitudinally between brackets 35, 36 and brackets 37, 38 are guide rods 40 and 41 respectively which slidingly support a carriage 45 for reciprocal movement thereon. A bracket 46 extending between cross members 11 and 12 and on the intermediate portions thereof suitably support the rod end of a pneumatic cylinder 48. The head end of pneumatic cylinder 48 is connected to carriage 45 to facilitate the movement of such carriage into and out of belt-engaging position. A pulley 50 is suitably journaled on a bracket 51 which is mounted on carriage 45 for movement with such carriage. Pulleys 50 and 24 support an endless belt therebetween. Suitably connected to bracket 35 is a laterally extending bracket 31 which supports for rotation rollers 32 and 33 to guide a belt as it moves onto pulley 50.

A support means 52 has one end pivotally connected to the lower most end portion of carriage 45 as at 53. The other end portion of support means 52 has a projection 54 which rides in curved slot 55 of a plate member 56, which plate member 56 is attached to one of the frame members 10. Curvilinear slot 55 and projection 54 cooperate to define a cam means. As shown in FIG. 1, projection 54 is located in the lower portion of slot 55, and as carriage 45 is moved in a leftward direction to the position shown in FIG. 2, such projection rides upwardly to pivot the support means 52 in a clockwise direction such that a rotary cutter 57 suitably journaled on support means 52 is camed upwardly into cutting position as shown in FIG. 2. A motor 60 is located on the lower end portion of support means 52 and has its output shaft 61 supporting a sheave 62. A sheave 63 is suitably keyed to the same shaft as the cutter 57 such that a belt 64 trained about sheaves 63 and 62 is operative to drive rotary cutter 57. Suitably mounted on the forward portion of the cutting apparatus are a pair of trimming cutters 66 and 67 driven by motors now show such that their energization will rotate the cutters 66 and 67 to perform the trimming operation on the respective side edges a and b of a V-belt 70 that is journaled on pulleys 24 and 50. The belt 70 has parallel surfaces c and d, with surface d being smaller than c.

In the operation of the apparatus described, assuming that the cutting apparatus is in the position shown in FIG. 1, an endless belt 70 is positioned on the pulleys 24 and 50 such as to encompass the respective outward peripheral portions of such pulleys. With the rotary cutter 57 positioned in the lower position as shown in FIG. 1, the belt 70 is readily positioned on the pulleys without interference. Cutters 66 and 67 are then rotated by their respective motors and the head end of pneumatic cylinder 48 is energized, thereby moving carriage 45 in a leftward direction to the position shown in FIG. 2, whereby belt 70 is tensioned and the respective edges are brought into cutting engagement with the cutters 66 and 67. Such action provides a tensioning on the spring 30 and moves lever member 16 in a clockwise direction to provide the necessary tension on such belt 70 and pulley 24. Along with such action, cutter 57 is pivoted in an upwardly direction by the caming action of projection 54 riding in curved slot 55 such that support means 52 is pivoted into an upwardly direction until cutter 57 comes in contact with the belt 70 to perform a cutting operation on the smaller running surface d of the V-belt. A back-up support 71 is located on carriage 45 to prevent deformation of the belt 70 and assure a proper control of the depth of cut by rotary cutter 57. Suitable means are provided for trim cutters 66 and 67 to move such cutters toward and away from each other to control the depth of cut on the V-belt 70.

A modification of the described apparatus is shown in FIG. 6 wherein a base member 75 supports vertically extending brackets 76, 77, 78, 79 and 80 to provide support means for the apparatus described. Brackets 79 and 80 support a pair of ways 81 which provide guide means for a pair of slides 82–83. A pair of end plates 84 and 85 are connected to the respective end portions of brackets 79 and 80, which plates 84 and 85 suitably journal for rotation a threaded rod 86 which is suitably connected to the respective slides 83 and 82, such that rotation of the threaded rod 86 by hand wheel 89 moves the respective slides 82 and 83 towards, or away from each other. Mounted on slides 82 and 83 are motors 90 and 91, which motors have their output shaft connected to rotary trimming cutters 92 and 93 which operate in the same manner as the previously described cutters 66 and 67 to trim the edges of a V-belt. Bracket 76 supports a pneumatic cylinder 95 which has its output shaft 96 suitably connected to a carriage 97 which is guided for longitudinal movement on guide rods 98–98 in a manner to be described. Guide rods 98 have their respective end portions connected to brackets 77 and 78. Mounted on carriage 97 is a motor 99 which has its output shaft connected to drive a sheave 100. Mounted on the other end portion of carriage 97 is a bracket 101 which supports a shaft 102 which shaft 102 has mounted on one end thereof a sheave 103 and on the other end a pulley 105. A belt 106 is trained between sheaves 100 and 103 such that energization of motor 99 operates to rotate sheave 103 and pulley 105. Mounted on the intermediate portion of base member 75 is an upwardly extending support member 107 which has pivotally mounted on the upper end portion thereof a pneumatic cylinder 108 whose piston rod 109 is pivotally connected to a rigid V-shaped lever means 110 having a downwardly diverging lever member 111 connected to a pair of lever members 112. The junction of members 111 and 112 is pivotally connected as at 113 on support member 107 such that pressurization of the head end of cylinder 108 pivots lever member 111 in a clockwise direction which in turn swings the forwardly disposed portion of lever members 112 downwardly into an operative position whereby a pulley 115 journaled on the end portion of members 112 is adapted to support and tension a belt 116 that extends between pulleys 105 and 115. Support member 107 has one end of a plate member 118 pivotally mounted thereon, as at 117 with the other end of plate member 118 supporting a roller 119. Roller 119 is adapted to abuttingly contact a running surface of the V-belt 116 that is trained about pulleys 105 and 115. Plate member 118, along with roller 119, is subject to being adjusted thereon through adjusting means 120 operatively connected to the intermediate portion of plate member 118. Base member 75 supports a pair of guide ways 121 and 122 which support for reciprocal movement a slide 125. A bracket 126 mounted on the end portion of guide ways 121 and 122 supports a pneumatic cylinder 127 whose piston rod 128 is connected to slide 125. Slide 125 supports a motor 129 whose output shaft is connected to a rotary milling cutter 130 which, as seen in FIG. 7, is adapted to operate on the lower surface portion of the V-belt 116, similar to side d of belt 70.

In the operation of the apparatus described, the operator positions the V-belt 116 on pulleys 105 and 115 wherein there is sufficient slack to permit the insertion of V-belt thereon. Prior to this pneumatic cylinder 108 is de-energized such that the rod 109 is in the retracted position shown in FIG. 6, whereby pulley 115 is in a raised position. The operator then energizes the rod end of cylinder 95 to move the carriage 97 in a leftward direction as viewed in FIG. 6, and energizes head end of pneumatic cylinder 108 which extends rod 109 pivoting members 112 about pivotal connection 113 in a clockwise direction, whereby pulley 115 tensions the belt 116. The operator then energizes motor 99 for rotating pulley 105 and the V-belt 116. Trimming cutters 92 and 93 are moved into cutting position on the V-belt 116 through the manipulation of hand wheel 89 which through threaded rod 86 positions such cutters into the position shown in FIG. 8. Pneumatic cylinder 127 is then energized to extend piston rod 128 outwardly which moves slide 125 in a rightward direction, as viewed in FIG. 7, to position the rotary cutter 130 into cutting engagement with a smaller running surface of V-belt 116 which performs the shaping operation of such V-belt, whereby three running edges of a V-belt are cut to the exact dimension desired, thus assuring that the proper weight per unit of length of belt is provided facilitating the molding operation.

I claim:

1. A trimming machine comprising means for tensioning and advancing an endless strip having a substantially rectangular cross section, trimming means located on said machine for simultaneously and progressively trimming the opposite edges of the strip at an angle to their original planes, cutter means located on said machine adjacent to said trimming means for trimming the one continuous surface of the strip that extends between said opposite edges of the strip, and cam means connected to said cutter means for selectively moving said cutter means toward and away from said trimming means.

2. A trimming machine as set forth claim 1 wherein said tensioning means includes a carriage, a pulley rotatably mounted on said carriage, power operated means connected to said carriage for moving said carriage in a first direction to tension the endless strip and in a second direction away from said trimming means to permit unloading of the endless strip, and said cutter means being a rotary driven cutter with a wide annular peripheral cutting surface.

3. A trimming machine as set forth in claim 2 wherein said tensioning means includes a lever member, a pulley mounted on said lever member, and means brasing said lever member away from said carriage.

4. A trimming machine as set forth in claim 3 wherein said cutter means is mounted on a support member pivotally secured to said carriage for movement therewith, and said cam means being an arcuately shaped groove in a plate mounted on the trimming machine and a projection on said support member riding in said groove.

5. A trimming machine for shaping rectangularly cross-sectioned belts into trapezoidal cross-sectioned belts comprising: support means, a carriage mounted on one end of said support means for reciprocal movement thereon, a pulley mounted on said carriage for movement therewith, power operated means connected to said carriage for reciprocating said carriage between an inoperative loading position and an operative position, lever means pivotally mounted on the other end of said support means, a pulley mounted on said lever means for cooperation with said first-mentioned pulley for supporting an endless band of material, means biasing said lever means away from said carriage, a trimming means for simultaneously and progressively trimming the opposite edges of a strip at an angle to the original planes of movement, motive means connected to one of said pulleys for rotating said one pulley, a support member pivotally mounted on said carriage and movable therewith, rotary cutter means mounted on said support memeber, motive means mounted on said support member for rotating said cutter means, and cam means cooperative with the movement of said carriage to pivot said support member and cutter means upwardly into operative position for positioning said cutter means into engagement with the lower run of an endless band of material.

6. A trimming machine as set forth in claim 5 wherein said cam means includes a projection and a plate member, , said projection being mounted on said support member, said plate member being mounted on said support means, said plate member having a curvilinear groove therein for caming said support member and rotary cutter means relative to said carriage.

7. A trimming machine for V-belts comprising means for tensioning and advancing a V-belt along a continuous path having an upper pass line and a lower pass line, trimming cutter means located on said machine for simultaneously and progressively trimming the opposite side edges of the V-belt, a cross slide mounted on said machine for transverse movement toward and away from one of said pass lines, power operated means connected to said cross slide for moving said cross slide in said transverse directions, and cutting means mounted on said slide for movement therewith.

8. A trimming machine for V-belts as set forth in claim 7 wherein said V-belt in said lower pass line presents a pair of oppositely disposed side edges and an upper running surface and a lower running surface, said lower running surface being of lesser width and transverse dimension than the transverse dimension of said upper running surface, said cutting means being a rotary milling cutter whose cutting edges operate on said lower running surface, and a back-up roller located adjacent to said upper running surface diametrically opposed to said cutting edges.

9. A trimming machine as set forth in claim 8 wherein said tensioning means includes a pair of spaced pulleys, one said pulley rotatably mounted on a carriage, power operated means connected to said carriage for moving said carriage toward and away from said pass lines along a line that is parallel to said pass line, the other one of said pulleys being mounted on a lever member, and means connected to said lever member for pivoting said lever member and said other pulley into operative position to advance a belt along said upper and lower pass line and into inoperative away from said trimming cutter means.

10. A trimming machine as set forth in claim 8 wherein adjustin means are operatively connected to said back-up roller to move said back roller incrementally toward and away from said lower pass line.

11. A trimming machine for V-belts comprising a support means; a pair of spaced pulleys mounted on said support means, the axes of said pulleys being normal to the longitudinal center line of said machine, a carriage mounted on said support means; one of said pulleys mounted on said carriage; a first power means connected to said carriage for moving said carriage linearly along said longitudinal center line; the other of said pulleys being mounted on pivotal member means, second power means connected to said pivotal member means for moving the axis of said other pulley away from said longitudinal center line for retraction and toward said longitudinal center line for an operative position; spaced trimming cutters movable toward and away from said other pulley in said operative position to determine the depth of cut on a V-belt encompassing said pulleys; said other pulley in said operative position cooperative with said one pulley to receive a V-belt to define an upper pass line and a lower pass line which lines are parallel to said longitudinal center line; the V-belt trained on said pulleys extending through said lower pass line presents a pair of oppositely disposed side edges and an upper running surface and a lower running surface; said lower running surface defining a first planar surface and said upper running surface defines a second planar surface; cutter means movable into and out of contact with said first planar surface; and idler means located on said support means having a tangential surface in alignment with said second planar surface and located adjacent to said cutter means.

12. A trimming machine as set forth in claim 11 wherein said cutter means includes a rotary cutter mounted on a slide; and power means connected to said slide for moving said slide in a direction normal to said longitudinal center line.

13. A trimming machine comprising means for tensioning and advancing an endless strip having a substantially rectangular cross section, said tensioning means including a pair of spaced pulleys for supporting said endless strip, each pulley having a common vertical plane that bisects said pulleys into equal halves, trimming means located on said machine for simultaneously and progressively trimming the opposite edges of the strip at an angle to their original planes, cutter means located on said machine adjacent to said trimming means for trimming the one continuous surface of the strip that extends between said opposite edges of the strip, and power operated means connected to said cutter means for selectively moving said cutter means into and away from said vertical plane.

* * * * *